United States Patent
Lim et al.

(10) Patent No.: US 8,261,077 B2
(45) Date of Patent: Sep. 4, 2012

(54) SYSTEM AND METHOD FOR PERFORMING AUTHENTICATION IN A WIRELESS MOBILE COMMUNICATION SYSTEM

(75) Inventors: Hyoung-Kyu Lim, Seoul (KR);
Young-Wook Kim, Yongin-si (KR);
Sae-Woong Bahk, Seoul (KR);
Jong-Tack Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1174 days.

(21) Appl. No.: 12/148,218

(22) Filed: Apr. 16, 2008

(65) Prior Publication Data
US 2008/0253569 A1 Oct. 16, 2008

(30) Foreign Application Priority Data
Apr. 16, 2007 (KR) .................. 10-2007-0036946

(51) Int. Cl.
*H04L 9/32* (2006.01)
(52) U.S. Cl. ........ 713/170; 713/168; 713/169; 713/176; 380/44; 380/270; 380/258; 455/335; 455/336; 455/337; 455/338
(58) Field of Classification Search .......... None
See application file for complete search history.

(56) References Cited

U.S. PATENT DOCUMENTS

| | | | |
|---|---|---|---|
| 7,505,775 B2 * | 3/2009 | Ryu et al. ............ | 455/458 |
| 7,752,441 B2 * | 7/2010 | Mizikovsky et al. ....... | 713/168 |
| 7,894,831 B2 * | 2/2011 | Ryu et al. ............ | 455/458 |
| 2005/0277417 A1 * | 12/2005 | Yoon et al. ............ | 455/436 |
| 2006/0070116 A1 | 3/2006 | Park | |
| 2007/0218926 A1 * | 9/2007 | Zhuang et al. ........... | 455/466 |
| 2007/0249347 A1 * | 10/2007 | Saifullah et al. .......... | 455/436 |
| 2008/0192931 A1 | 8/2008 | Cho et al. | |
| 2008/0256477 A1 | 10/2008 | Cho et al. | |
| 2008/0259889 A1 * | 10/2008 | Wu ..................... | 370/338 |
| 2009/0164788 A1 * | 6/2009 | Cho et al. .............. | 713/175 |

FOREIGN PATENT DOCUMENTS

| | | |
|---|---|---|
| JP | 2005327693 | 11/2005 |
| KR | 10-2006-0029047 | 4/2006 |
| KR | 10-2006-0134775 | 12/2006 |
| KR | 10-2008-0093185 | 10/2008 |

OTHER PUBLICATIONS

Song et al, The AES-CMAC algorithm, Jun. 2006, Network working Group(RFC 4493).*

* cited by examiner

*Primary Examiner* — Fikremariam A Yalew (57) ABSTRACT

A system and method for authentication in a wireless mobile communication system are provided, in which a mobile station calculates a CMAC value having a first number of bits, transmits to a base station a ranging request message including a partial CMAC value being a second number of upper bits of the CMAC value having the first number of bits, and receives a ranging response message indicating whether authentication is successful or failed from the base station.

33 Claims, 11 Drawing Sheets

SYSTEM AND METHOD FOR PERFORMING AUTHENTICATION IN A WIRELESS MOBILE COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Apr. 16, 2007 and assigned Serial No. 2007-36946, the entire disclosure of which is hereby incorporated by reference.

TECHNICAL FIELD OF THE INVENTION

The present invention generally relates to a wireless mobile communication system. More particularly, the present invention relates to a method and system for authenticating a mobile station.

BACKGROUND OF THE INVENTION

Providing services with different Quality of Service (QoS) requirements to users at high rates is an active study area for a future-generation wireless mobile communication system. A major future-generation wireless mobile communication system is Institute of Electrical and Electronics Engineers (IEEE) 802.16. Mobile stations operate in three modes in the future-generation wireless mobile communication system, which will be described with reference to FIG. 1.

Figure 1:
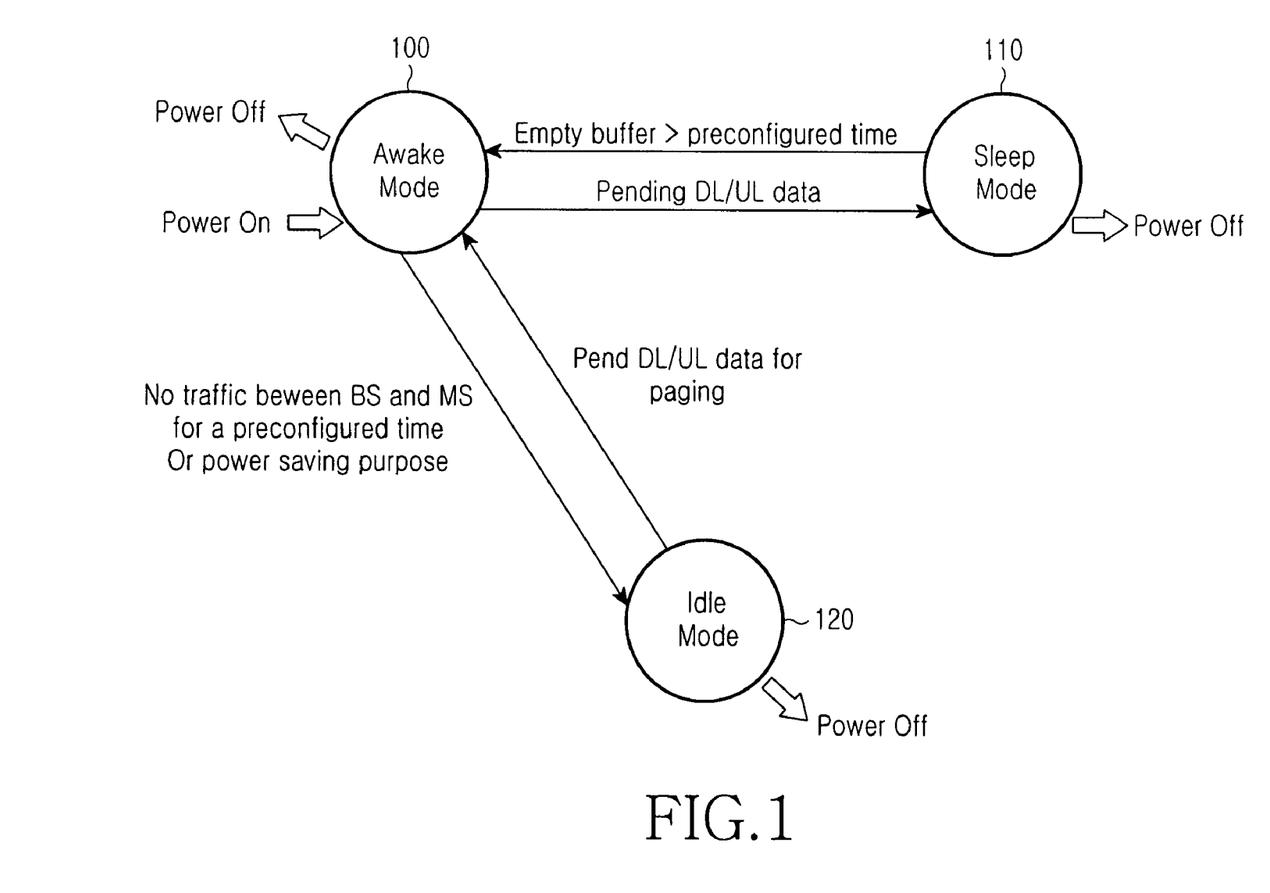
FIG. 1 is a mode transition diagram in a conventional wireless mobile communication system.

FIG. 1 is a mode transition diagram in a conventional wireless mobile communication system.

Referring to FIG. 1, a mobile station (MS) communicates with a base station (BS) normally in awake mode 100, thus consuming more power than in sleep mode 110 or idle mode 120. Since the MS is always awake in the awake mode 100, it can fast cope with any request from the BS.

The sleep mode 110 is a mode that minimizes the power consumption of the MS. Thus, the MS cannot transmit and receive traffic in the sleep mode 110.

In the idle mode 120, the MS wakes up periodically to receive signals. The MS can move without being registered to a particular BS in the idle mode 120. Since the MS can move from one BS to another in the idle mode 120, it does not need perform a handover procedure and only has to receive signals broadcast by a BS, periodically waking up. As resources are allocated to the idle-mode MS only upon request of downlink or uplink traffic from the MS, resource consumption is minimized on the part of the BS. Either the MS or the BS can initiate the MS's transition to the idle mode 120.

Figure 2:
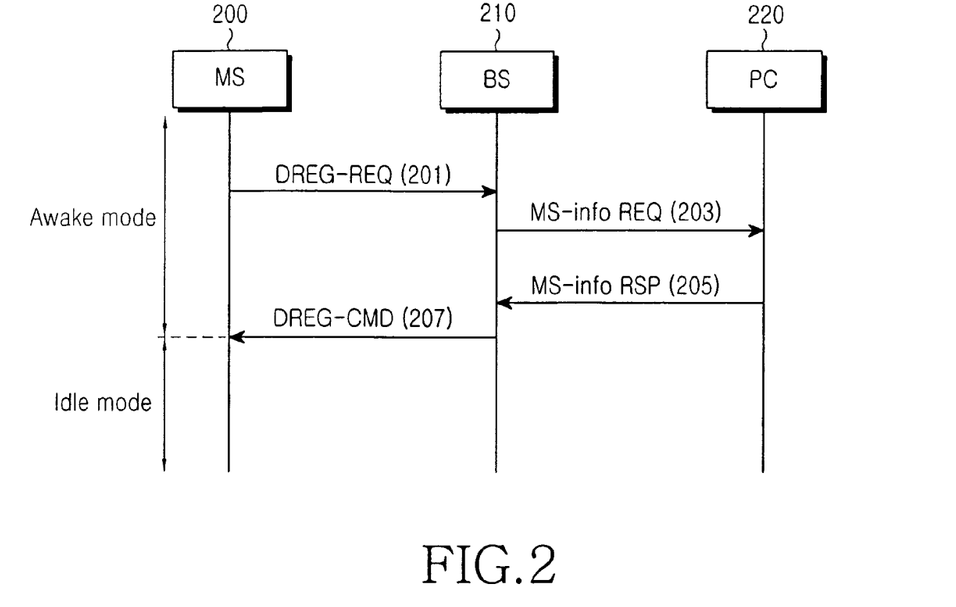
FIG. 2 is a diagram illustrating a signal flow for a conventional procedure for an MS-initiated transition to idle mode.

FIG. 2 is a diagram illustrating a signal flow for a conventional procedure for an MS-initiated transition to idle mode.

Referring to FIG. 2, an MS 200 transmits a De-REGistration-REQuest (DREG-REQ) message to a BS 210, indicating that it wants to transition to the idle mode in step 201. The DREG-REQ message has De-Registration Request Code set to 0x01, which implies that the MS 200 requests the idle mode transition.

In step 203, the BS 210 transmits an MS-info REQ message requesting information about the MS 200 to a Paging Controller (PC) 220. The BS 210 then receives an MS-info RSP message including the MS information from the PC 220 in step 205. The MS information may include information about a context, connection, and operation of the MS 200.

The BS 210 replies to the MS 200 with a De-REGistration CoMmanD (DREG-CMD) message in response to the DREG-REQ message in step 207.

Upon receipt of the DREG-CMD message, the MS 200 transitions to the idle mode.

Figure 3:
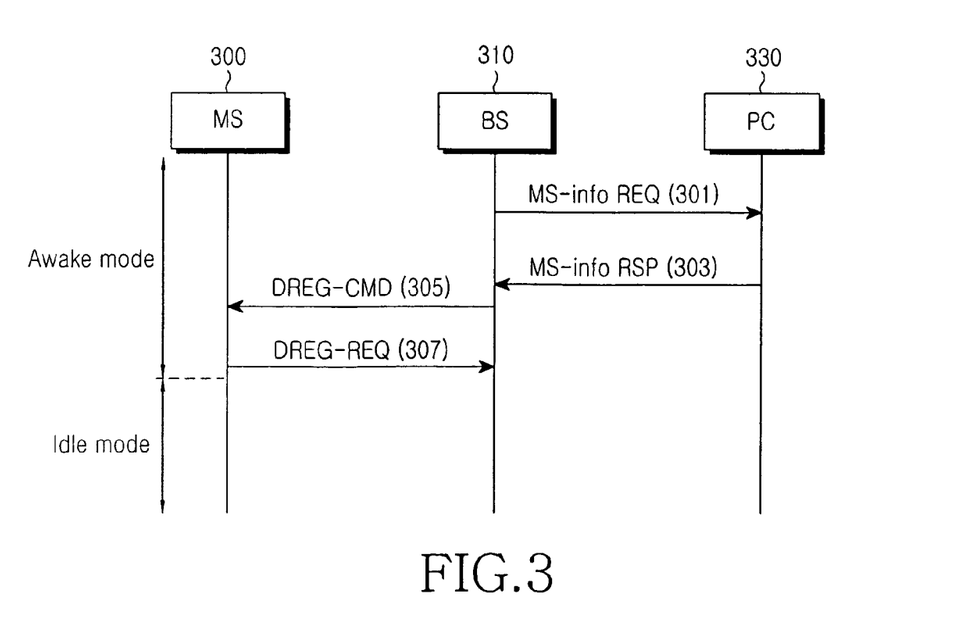
FIG. 3 is a diagram illustrating a signal flow for a conventional procedure for a BS-initiated transition to idle mode.

FIG. 3 is a diagram illustrating a signal flow for a conventional procedure for a BS-initiated transition to idle mode.

Referring to FIG. 3, a BS 310 transmits an MS-info REQ message requesting information about an MS 300 to a PC 320 in step 301. The BS 310 then receives an MS-info RSP message including the MS information from the PC 320 in step 303. The MS information may include information about a context, connection, and operation of the MS 300.

The BS 310 transmits a DREG-CMD message to the MS 300 to request transition to the idle mode in step 305. The DREG-CMD message has Action Code set to 0x05, which implies that the BS 310 requests the MS 300 to transition to the idle mode.

Upon receipt of the DREG-CMD message from the BS 310, the MS 300 transmits a DREG-REQ message with De-Registration Request Code set to 0x02 to the BS 310 in step 307. Then the MS 300 transitions to the idle mode.

After transitioning to the idle mode in the procedure of FIG. 2 or FIG. 3, the MS should update its location periodically or according to any other condition. The location update takes place in the following four cases:

1. when a paging group is changed;
2. when a predetermined time has elapsed;
3. when MS is power-off; and
4. when the MS has not been paged from the BS more than a Medium Access Control (MAC) layer-set number of times.

The location update can be considered in two ways, secure location update and unsecure location update.

Figure 4:
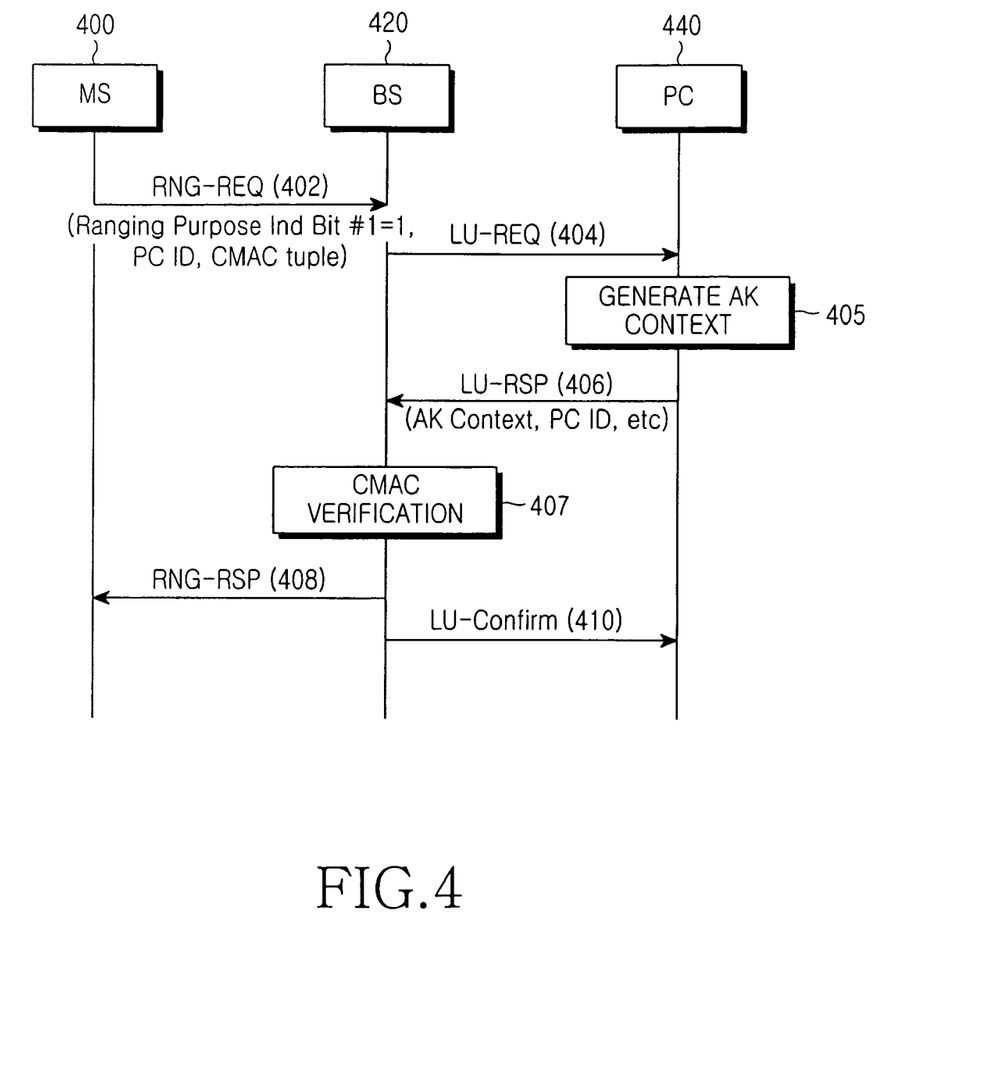
FIG. 4 is a diagram illustrating a signal flow for a conventional secure location update procedure in an idle-mode MS.

FIG. 4 is a diagram illustrating a signal flow of a conventional secure location update procedure for an idle-mode MS.

Referring to FIG. 4, an MS 400 transmits a RaNGing-REQuest (RNG-REQ) message to a BS 420 in step 402. The RNG-REQ message has a ranging purpose indication Type/Length/Value (TLV) bit (bit #1) set to 1, including an IDentifier (ID) of a PC 440 and a Cipher-based Message Authentication Code (CMAC) tuple.

The BS 420 transmits a Location Update-REQuest (LU-REQ) message to the PC 440 in step 404. The PC 440 generates an Authentication Key (AK) context associated with authentication of the MS 400 in step 405 and transmits a Location Update-ReSPonse (LU-RSP) message including the AK context and the PC ID to the BS 420 in step 406.

The BS 420 verifies a CMAC value set in the CMAC tuple using the AK context included in the LU-RSP message in step 407 and transmits a RaNGing-ReSPonse (RNG-RSP) message to the MS 400 in step 408. If the verification is successful, the RNG-RSP message includes the CMAC value and an update response TLV. The BS 420 transmits a Location Update-confirm (LU-confirm) message to the PC 440 in step 410.

Figure 5:
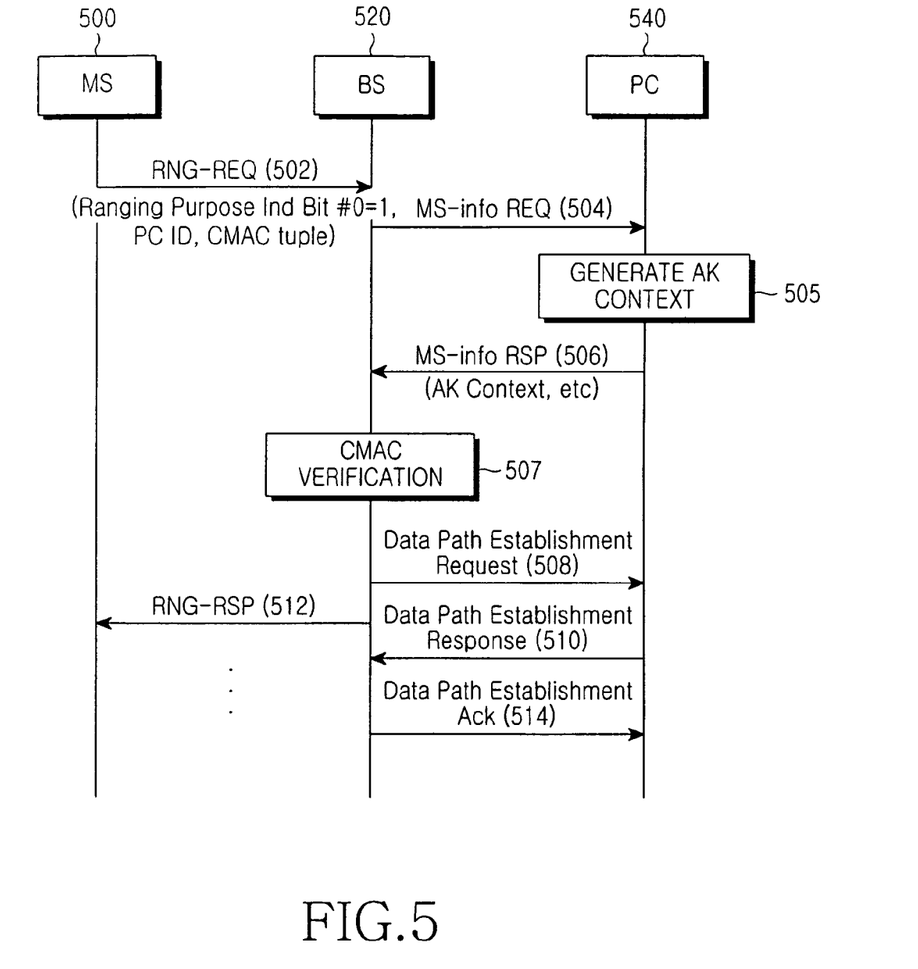
FIG. 5 is a diagram illustrating a signal flow for a conventional unsecure location update procedure in an idle-mode MS.

FIG. 5 is a diagram illustrating a signal flow for a network re-entry procedure of an idle-mode MS.

Referring to FIG. 5, an MS 500 transmits an RNG-REQ message to a BS 520 in step 502. The RNG-REQ message has a ranging purpose indication TLV bit (bit #0) set to 1, including an ID of a PC 540 and a CMAC tuple.

The BS 520 transmits an MS-info REQ message to the PC 540, requesting information about the MS 500 in step 504. The PC 540 generates an AK context in step 505 and transmits an MS-info RSP message including the AK context to the BS 520 in step 506. The MS information is useful to expedite the network re-entry procedure by skipping or simplifying some parts of the call flows which are the same as the initial network entry procedure.

The BS 520 verifies a CMAC value set in the CMAC tuple using the AK context in step 507, transmits a data path establishment request message to the PC 540 in step 508, and receives a data path establishment response message from the PC 540 in step 510. In step 512, the BS 520 transmits an RNG-RSP message to the MS 500. The RNG-RSP message includes information indicating whether the location update has been successful. The BS 520 transmits a data path establishment Acknowledgment (Ack) message to the PC 540 in step 514.

Figure 6:
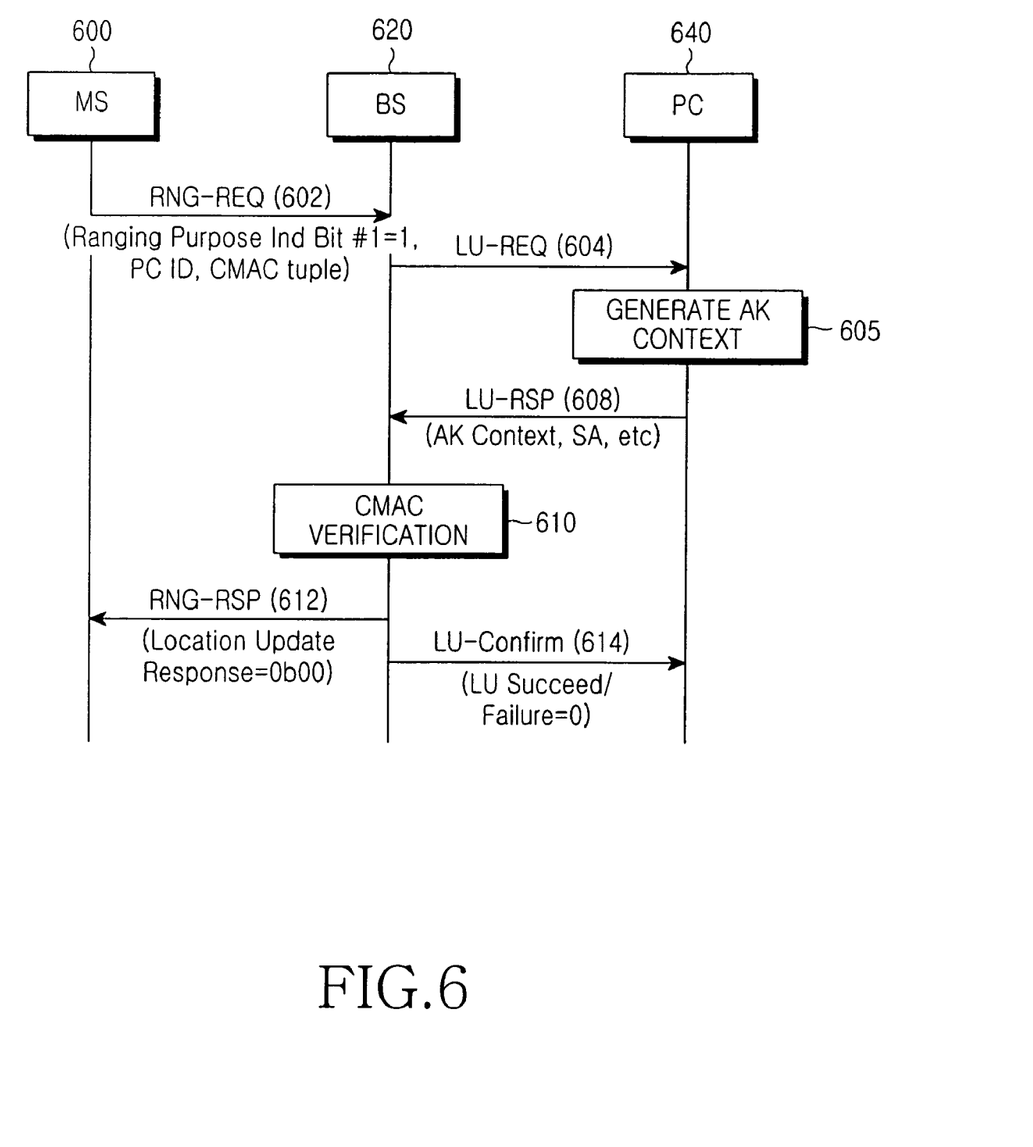
FIG. 6 is a diagram illustrating a signal flow in the case of a DoS attack situation during a conventional CMAC-based location update procedure.

FIG. 6 is a diagram illustrating a signal flow when the secure location update fails. This case could be abused as a Denial of Service (DoS) attack by malicious users.

Referring to FIG. 6, an MS 600 transmits an RNG-REQ message with a CMA tuple, requesting location update to a BS 620 in step 602. The BS 620 transmits an LU-REQ message to a PC 640 in step 604.

The PC 640 generates an AK context in response to the location update request in step 606 and transmits an LU-RSP message including the AK context to the BS 620 in step 608.

In step 610, the BS 620 verifies a CMAC value set in the CMA tuple received from the MS 600. If the CMAC value turns out invalid, the BS 620 transmits an RNG-RSP message indicating failure of the location update to the MS 600 in step 612 and transmits an LU-confirm message indicating the failed location update to the PC 640 in step 614.

As described above, the MS can protect the RNG-REQ message against forgery or tampering by including a CMAC tuple TLV in the RNG-REQ message during location updates. The BS verifies the CMAC value of RNG-REQ message by comparing it with the locally calculated one using the AK context received from the PC. As a result, the BS can determine whether the RNG-REQ message maintains its integrity.

The CMAC verification should be carried out whenever BS receives a CMAC-protected RNG-REQ message from an MS. In case that the message is corrupted and proved to be invalid, all the resources related with the location update call flows are wasted. For the DoS attacks, a large number of malicious mobile stations do the same thing, which might result in a severe waste of resources.

SUMMARY OF THE INVENTION

To address the above-discussed deficiencies of the prior art, it is a primary aspect of exemplary embodiments of the present invention to address at least the problems and/or disadvantages and to provide at least the advantages described below. Accordingly, an aspect of exemplary embodiments of the present invention is to provide an authentication method and system for saving resources in a wireless mobile communication system.

In accordance with an aspect of exemplary embodiments of the present invention, there is provided an authentication method of a mobile station in a wireless mobile communication system, in which the mobile station calculates a CMAC value having a first number of bits, transmits to a base station a ranging request message including a partial CMAC value being a second number of upper bits of the CMAC value having the first number of bits, and receives a ranging response message indicating whether authentication is successful or failed from the base station.

In accordance with another aspect of exemplary embodiments of the present invention, there is provided an authentication method of a base station in a wireless mobile communication system, in which the base station receives from a mobile station a first message including a partial CMAC value being a second number of upper bits of a CMAC value having a first number of bits, transmits a second message including the partial CMAC value to a paging controller, and receives a third message from the paging controller.

In accordance with a further aspect of exemplary embodiments of the present invention, there is provided an authentication method of a paging controller in a wireless mobile communication system, in which the paging controller receives from a base station a first message including a first partial CMAC value being a second number of upper bits of a CMAC value having a first number of bits, stores the first partial CMAC value, receives a second message including a second partial CMAC value from the base station, compares the first partial CMAC value with the second partial CMAC value, generates an AK context required for the base station to perform CMAC verification for the mobile station, if the first and second partial CMAC values are identical, and transmits a third message including the AK context to the base station.

In accordance with still another aspect of exemplary embodiments of the present invention, there is provided a wireless mobile communication system for performing authentication, having a mobile station, a base station, and a paging controller. The mobile station calculates a CMAC value having a first number of bits, stores a partial CMAC value being a second number of upper bits of the CMAC value having the first number of bits, transmits a first message including a partial CMAC value being a second number of upper bits of the CMAC value having the first number of bits to the base station, and receives a second message indicating whether authentication is successful or failed from the base station.

In accordance with further another aspect of exemplary embodiments of the present invention, there is provided a wireless mobile communication system for performing authentication, having a mobile station, a base station and a paging controller. The base station receives a first message from the mobile station, transmits to the paging controller a second message including a partial CMAC value being a second number of upper bits of a CMAC value having a first number of bits, receives from the paging controller a third message including an AK context required for CMAC verification of the mobile station, verifies a CMAC value corresponding to a third number of lower bits of the CMAC value of the mobile station, and transmits a fourth message including a verification result to the mobile station.

In accordance with yet another aspect of exemplary embodiments of the present invention, there is provided a wireless mobile communication system for performing authentication, having a mobile station, a base station and a paging controller. The paging controller receives a first message from the base station, the first message including a first partial CMAC value being a second number of upper bits of a CMAC value having a first number of bits, stores the first partial CMAC value, compares the first partial CMAC value with a second stored partial CMAC value, generates an AK context, if the first and second partial CMAC values are identical, and transmits a second message including the AK context to the base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent-like parts.

DETAILED DESCRIPTION OF THE INVENTION

FIGS. 7 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a method and system for performing more reinforced authentication with a reduced load using a partial CMAC value in a wireless mobile communication system.

Figure 7:
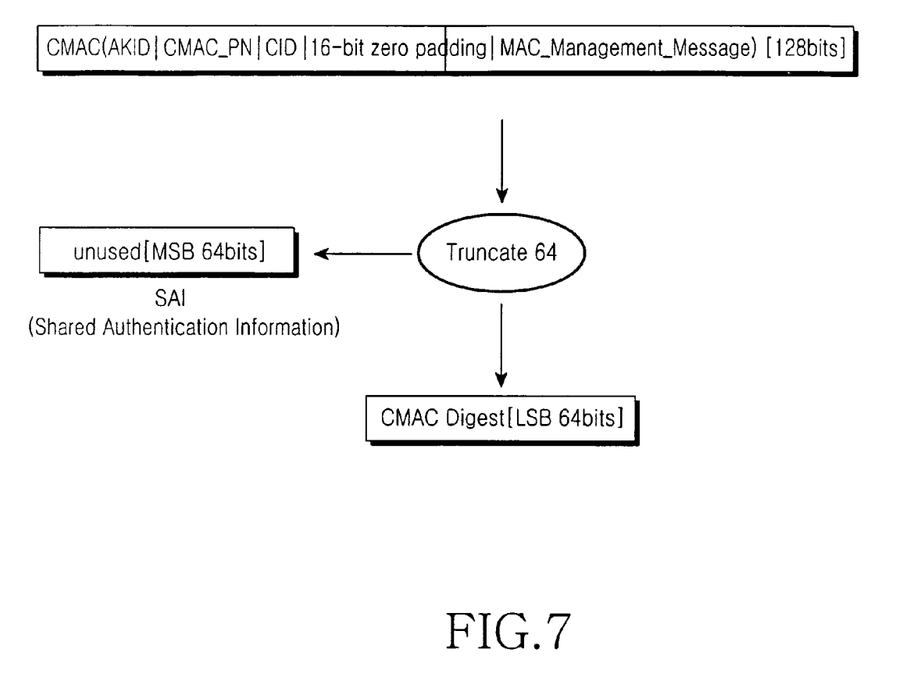
FIG. 7 illustrates an operation for determining a partial CMAC value for use in MS authentication according to an exemplary embodiment of the present invention.

FIG. 7 illustrates an operation for determining a partial CMAC value for use in mobile station (MS) authentication according to an exemplary embodiment of the present invention.

Referring to FIG. 7, an entire CMAC value is computed using a CMAC key (CMAC_KEY), an Authentication Key Identifier (AKID), a CMAC packet number counter, and a Connection ID (CID).

A plurality of CMAC keys are defined, including a downlink CMAC key (CMAC_KEY_D) for authenticating a downlink message and an uplink CMAC key (CMAC_KEY_U) for authenticating an uplink message. The CMAC key (CMAC_KEY) is generated out of an AK having its unique ID. Hence, an AKID used for determining a CMAC value is the AKID of the AK from which the CMAC key is generated. To prevent a replay attack, packet number counters are used for both the downlink and the uplink (CMAC_PN_U and CMAC_PN_D). Each packet number counter is a 4-byte value and increases each time one packet is transmitted. The CID is a connection ID specific to an MS allocated by the BS. The entire CMAC value is given as:

$$\text{CMAC value} <= \text{Truncate } 64(\text{CMAC}(\text{CMAC\_KEY\_*}, \text{AKID}|\text{CMAC\_PN}|\text{CID}|16\text{-bit zero padding}|\text{MAC\_Management\_Message}) \quad [\text{Eqn. 1}]$$

where Truncate64 denotes a function for truncating 64 Most significant Bits (MSBs) of a total 128-bit CMAC value. The present invention provides a more reinforced authentication procedure based on the 64-MSB CMAC value that is unused conventionally. The 64-MSB CMAC value is referred to as "Shared Authentication Information (SAI)".

Figure 8:
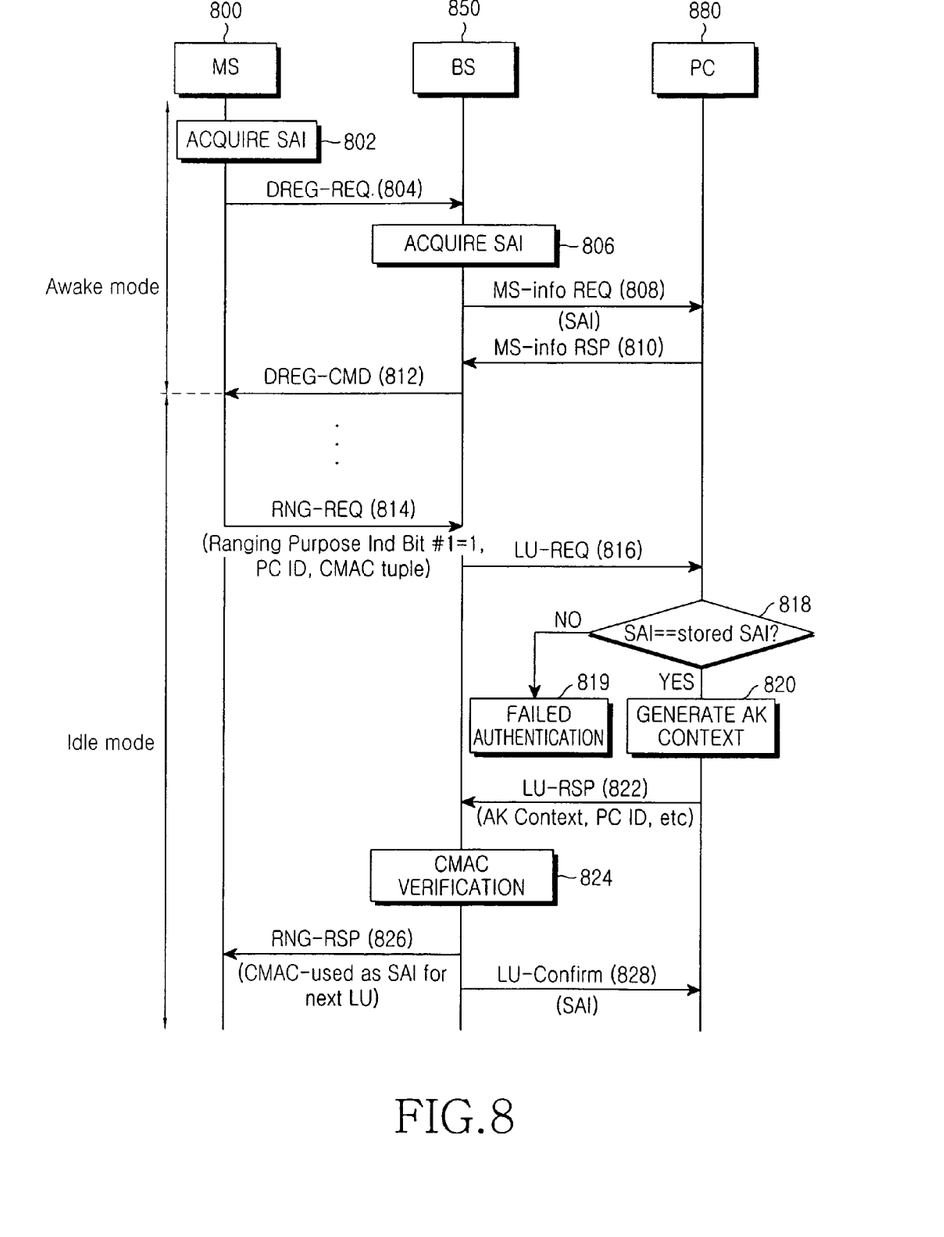
FIG. 8 is a diagram illustrating a signal flow for an SAI-based idle mode transition and location update procedure in a wireless mobile communication system according to an exemplary embodiment of the present invention.

FIG. 8 is a diagram illustrating a signal flow for a SAI-based idle mode transition and location update procedure in a wireless mobile communication system according to an exemplary embodiment of the present invention.

Referring to FIG. 8, an MS 800 acquires an SAI in awake mode in step 802. The SAI is 64 MSBs of a CMAC value. The MS 800 transmits a DREG-REQ message requesting an idle mode transition to a BS 850 in step 804.

In step 806, the BS 850 calculates the 128-bit CMAC value of the DREG-REQ message and acquires 64 MSBs of the CMAC value as the SAI. The BS 850 may store the SAI, for future use. The BS 850 transmits an MS-info REQ message including the SAI to a PC 880 in step 808. The PC 880 stores the SAI and transmits an MS-info RSP message including information about the MS 800 to the BS 850 in step 810. In step 812, the BS 850 transmits a DREG-CMD message indicating the idle mode transition to the MS 800.

Then the MS 800 transmits an RNG-REQ message requesting location update in the idle mode in step 814. The RNG-REQ message includes the SAI acquired in step 802.

The BS 850 transmits an LU-REQ message including the SAI to the PC 880 in step 816. In step 818, the PC 880 compares the SAI included in the LU-REQ message with the SAI stored in step 808. If the two SAIs are identical, the PC 880 generates an AK context in step 820 and transmits an LU-RSP message including the AK context to the BS 850 in step 822. Herein, it is assumed that the PC 880 performs only paging control and an authenticator is responsible for an authentication. Hence, the PC 880 can carry out the SAI comparison, whereas the authenticator can generate the AK context. On the other hand, if the SAIs are different, the PC 880 determines that the authentication is failed, that is, the location update is failed in step 819 and transmits an LU-RSP message indicating the failed location update to the BS 850.

The BS 850 verifies the CMAC value of the MS 800 using the AK context in step 824 and transmits an RNG-RSP message including the verification result to the MS 800 in step 826. Herein, it is assumed that the CMAC value turns out valid in the verification. Also, the BS 850 calculates a 128-bit CMAC value for the RNG-RSP message. The BS 850 transmits an LU-confirm message including 64 MSBs of the 128-bit CMAC value as an SAI for a next location update to the PC 880 in step 828. 64 LSBs of the 128-bit CMAC value are included in the RNG-RSP message.

If the SAIs are different in step 818, the PC 880 transmits an LU-RSP message indicating authentication failure to the BS 850. Hence, the PC 880 does not need to generate an AK context and the BS 850 does not need to verify the CMAC value either. The PC 880 can include the received SAI or the stored SAI in the LU-RSP message.

While the MS 800 and the BS 850 acquire an SAI based on the CMAC value included in the DREG-REQ message in the above description, they may operate in a different manner.

For example, the BS transmits a message requesting MS information to the PC and receives the MS information from the PC. The BS calculates a CMAC value based on the MS information and acquires 64 MSBs of the CMAC value as an SAI. The BS then transmits a message including the SAI to the PC. The PC stores the SAI.

Simultaneously, the BS transmits an RNG-REQ message including 64 LSBs of the CMAC value to the MS. The MS calculates a 128-bit CMAC value and compares 64 LSBs of the 128-bit CMAC value with the CMAC value set in the RNG-REQ message. If the two values are identical, the MS stores 64 MSBs of the calculated CMAC value as the SAI. The subsequent location update procedure is performed in the same manner as illustrated in FIG. 8. The BS's SAI acquisition may precede the MS's SAI acquisition. That is, when an idle mode transition is network-initiated, the BS transmits a DREG-CMD message. The BS calculates a 128-bit CMAC value for the DREG-CMD message and stores 64 MSBs of the CMAC value as an SAI. The BS transmits 64 LSBs of the CMAC value in the DREG-CMD message. The MS receives the DREG-CMD message and acquires the SAI by verifying the CMAC value set in the DREG-CMD message.

Figure 9:
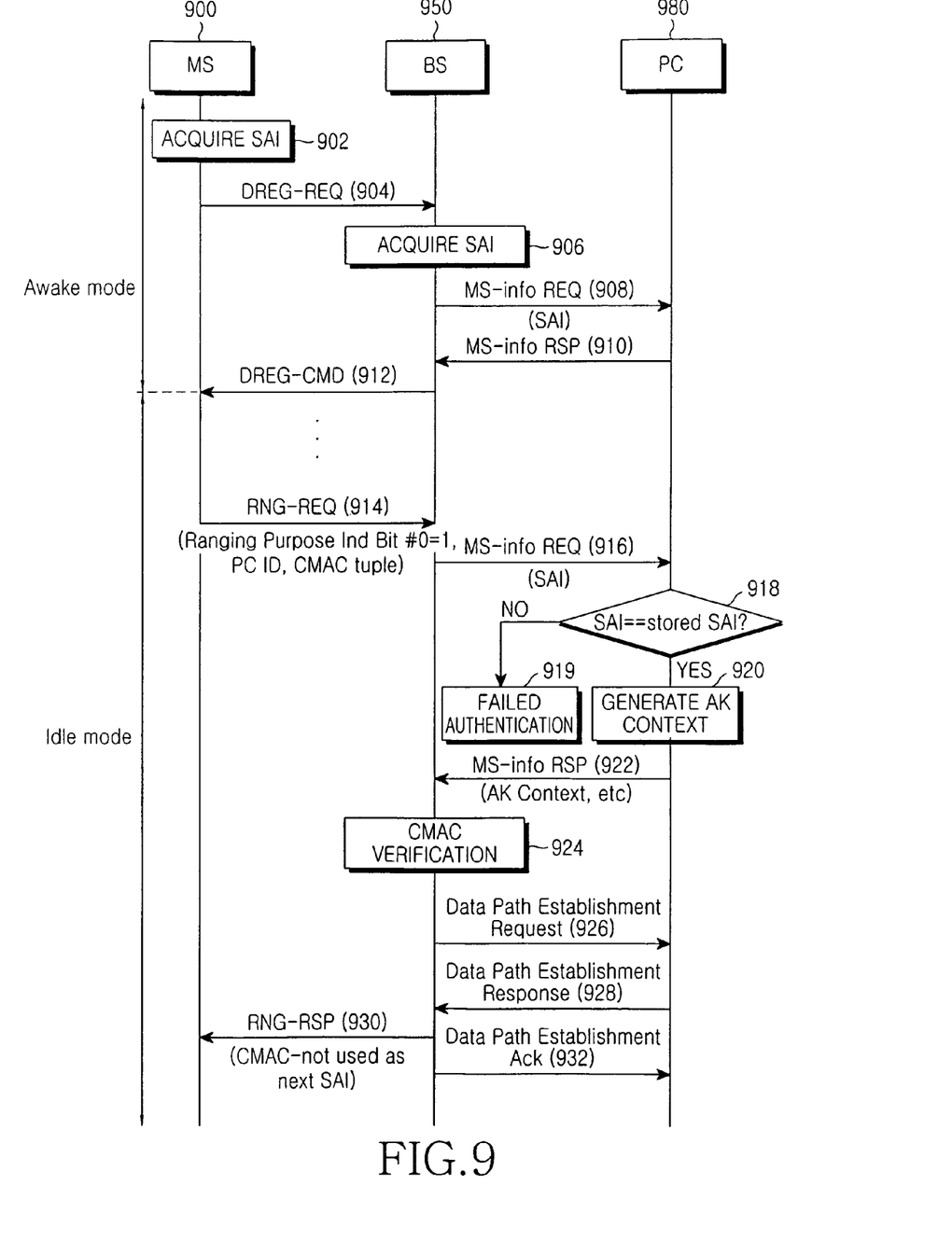
FIG. 9 is a diagram illustrating a signal flow for an SAI-based idle mode transition and network re-entry procedure in a wireless mobile communication system according to another exemplary embodiment of the present invention.

FIG. 9 is a diagram illustrating a signal flow for an SAI-based idle mode transition and network re-entry procedure in a wireless mobile communication system according to another exemplary embodiment of the present invention.

Referring to FIG. 9, steps 902 to 912 are about SAI acquisition to idle mode transition based on a received DREG-CMD message in an MS 900 and performed in the same manner as steps 802 to 812 of FIG. 8. Thus their description is not provided herein.

In step 914, the MS 900 transmits an RNG-REQ message requesting network re-entry to a BS 950 in the idle mode. The RNG-REQ message includes an SAI acquired in step 902, a PC ID, and a CMAC tuple.

The BS 950 transmits an MS-info REQ message including the SAI to a PC 980 in step 916. In step 918, the PC 980 compares the SAI set in the MS-info REQ message with an SAI stored in step 908. If the two SAIs are identical, the PC 980 generates an AK context in step 920 and transmits an MS-info RSP message with the AK context to the BS 950 in step 922. Herein, it is assumed that that the PC 980 performs only paging control and an authenticator is responsible for an authentication. Hence, the PC 980 can carry out the SAI comparison, whereas the authenticator can generate the AK context. On the other hand, if the SAIs are different, the PC 980 determines that the authentication is failed, that is, the location update is failed in step 919 and transmits an MS-info RSP message indicating the failed location update to the BS 950.

The BS 950 verifies the CMAC value of the MS 900 using the AK context in step 924 and transmits a data path establishment request message to the PC 980. The PC 980 replies with a data path establishment response message in step 928. In step 930, the BS 950 transmits an RNG-RSP message indicating the verification result to the MS 900. Herein, it is assumed that the CMAC value turns out valid in the verification. When the MS 900 performs network re-entry, the BS 950 does not use 64 MSBs of a 128-bit CMAC value of the RNG-RSP message as an SAI for the next location update. During the network re-entry, there is no need for a location update procedure between the MS 900 and the BS 950. If the location update is in progress, the 64 MSBs of the CMAC value of the RNG-RSP message is used as an SAI for the next location update.

If the SAIs are different in step 918, the PC 980 transmits an MS-info RSP message indicating the authentication failure to the BS 950. Hence, the PC 980 does not need to generate an AK context and the BS 950 does not need to verify the CMAC value either.

Figure 10:
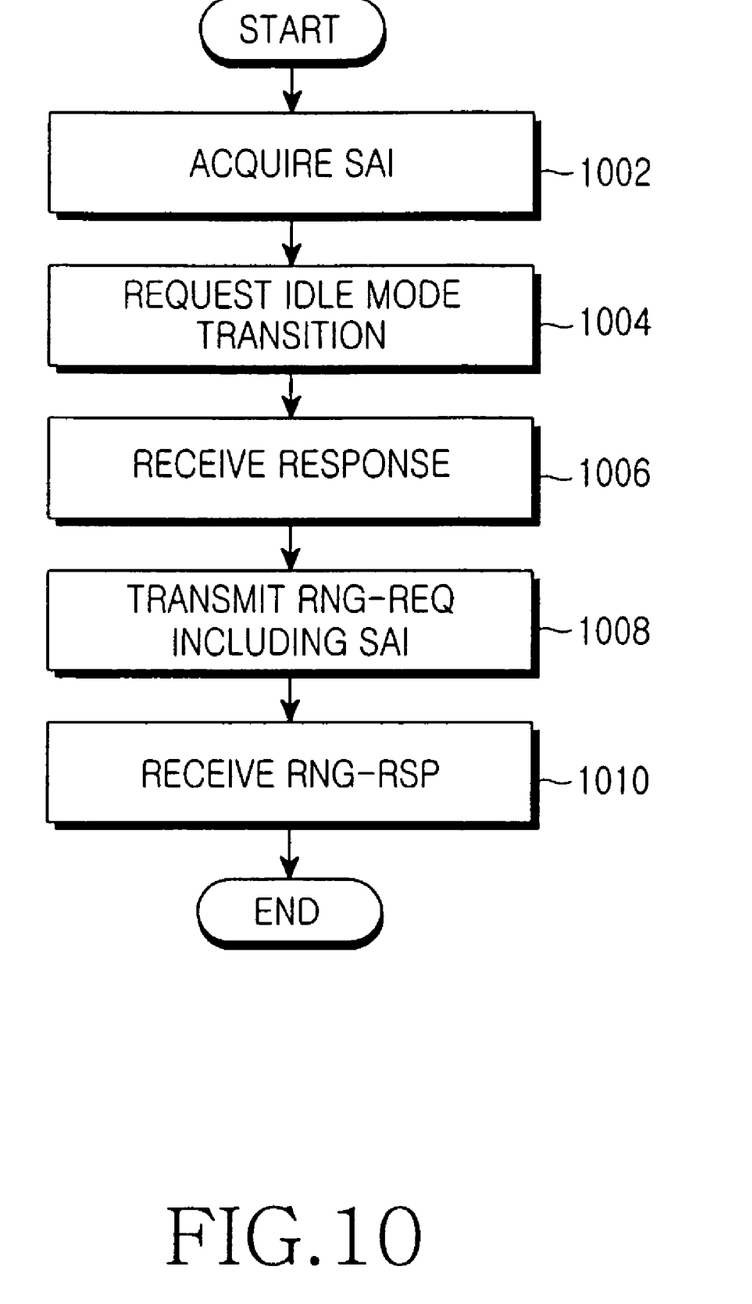
FIG. 10 is a flowchart illustrating an idle mode transition and location update operation in an MS according to the first exemplary embodiment of the present invention.
Figure 11:
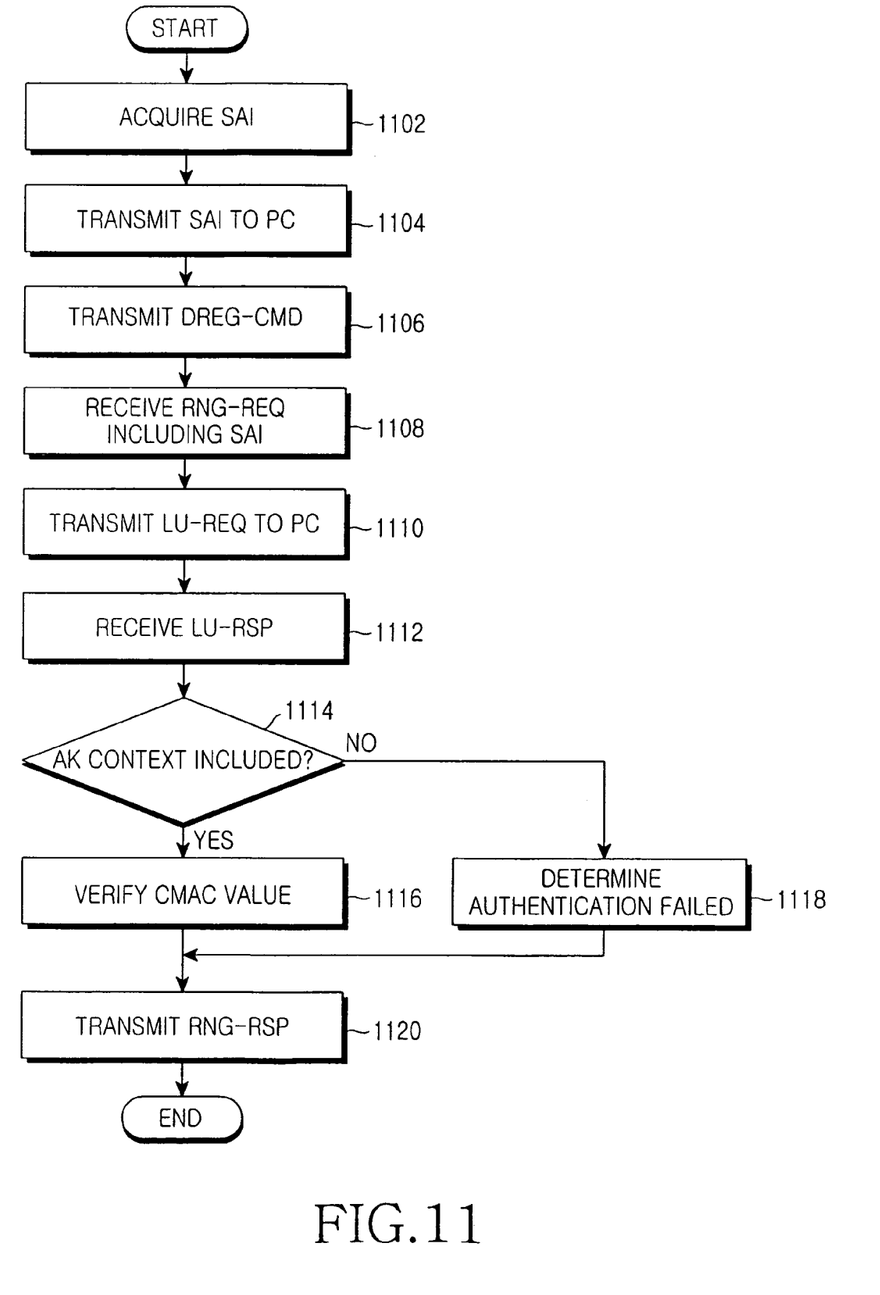
FIG. 11 is a flowchart illustrating a BS operation in relation to the idle mode transition and location update according to the first exemplary embodiment of the present invention.
Figure 12:
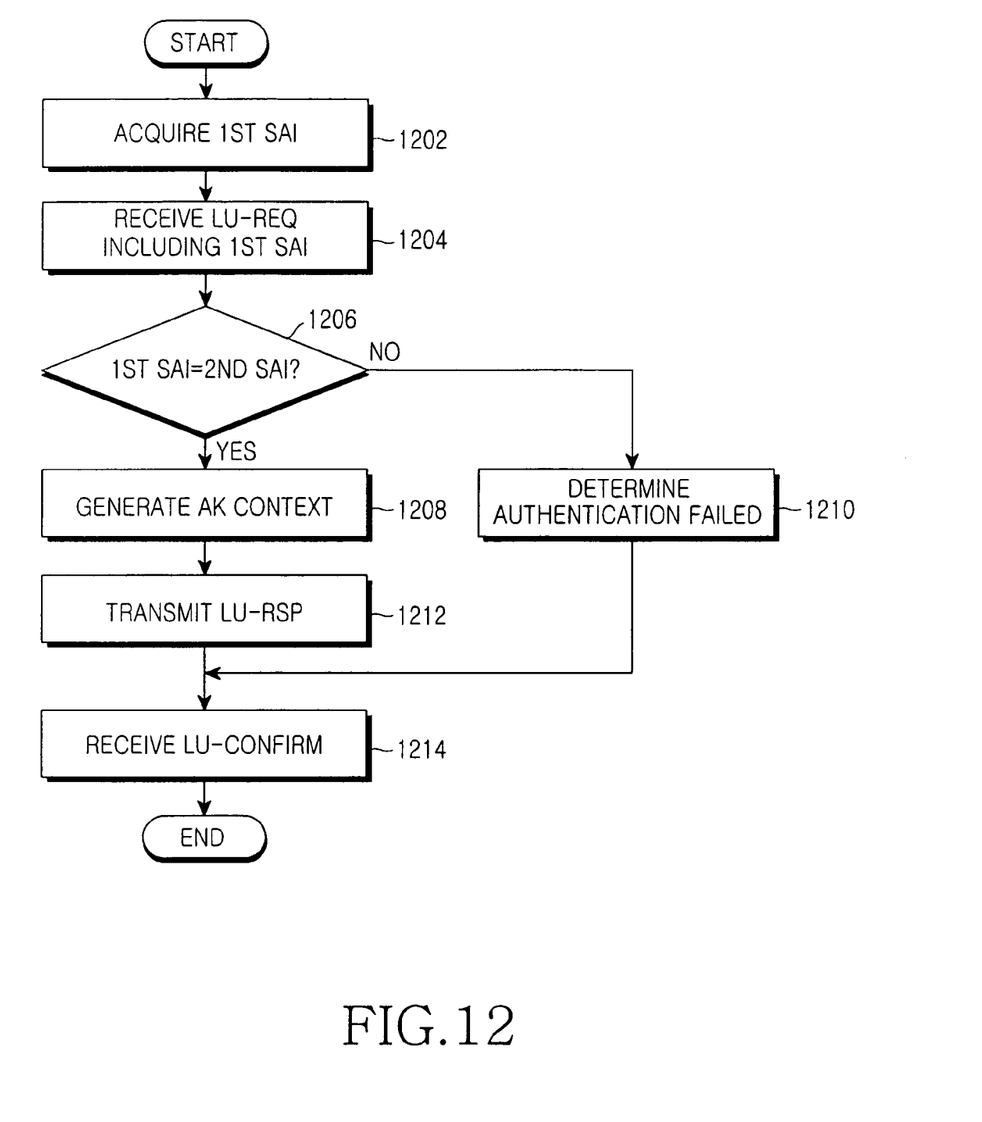
FIG. 12 is a flowchart illustrating a PC operation in relation to the idle mode transition and location update according to the first exemplary embodiment of the present invention.

With reference to FIGS. 10, 11 and 12, an MS-initiated transition to idle mode and location update procedure will be described below.

FIG. 10 is a flowchart illustrating an idle mode transition and location update procedure in an MS according to the first exemplary embodiment of the present invention.

Referring to FIG. 10, the MS calculates a CMAC value, acquires an SAI being 64 MSBs of the CMAC value in step 1002, and requests transition to idle mode to the BS in step 1004. The idle mode transition can be requested by transmitting a DREG-REQ message.

In step 1006, the MS receives a response message for the idle mode transition request from the BS. The response message can be a DREG-RSP message. Hence, the MS transitions to the idle mode.

The MS transmits an RNG-REQ message including the SAI to the BS in step 1008. The RNG-REQ message is used for the purpose of location update. In step 1010, the MS receives an RNG-RSP message indicating whether the location update is successful or failed from the BS.

FIG. 11 is a flowchart illustrating an operation of the BS in relation to the idle mode transition and location update according to the first exemplary embodiment of the present invention.

Referring to FIG. 11, the BS acquires an SAI by verifying a CMAC value of a DREG-REQ message in step 1102. Specifically, the BS calculates a 128-bit CMAC value for the DREG-REQ message by a CMAC algorithm and compares 62 LSBs of the calculated CMAC value with a 64-LSB CMAC value set in the DREG-REQ message. If the two values are equal, the BS considers that the verification is successful and if the two values are different, the BS considers that the verification is failed. In the former case, the BS acquires 64 MSBs of the calculated CMAC value as an SAI. The BS transmits a message including the SAI to the PC in step 1104 and transmits a DREG-CMD message indicating idle mode transition to the MS in step 1106.

The BS receives an RNG-REQ message including an SAI from the MS in step 1108 and transmits an LU-REQ message including the SAI to the PC in step 1110. In step 1112, the BS receives an LU-RSP message from the PC.

In step 1114, the BS determines whether the LU-RSP message includes an AK context. If the AK context is included, the BS verifies the CMAC value of the MS using the AK context in step 1116. If the CMAC verification is successful, the BS transmits an RNG-RSP message indicating the successful authentication to the MS in step 1120. If the AK context is not included, the BS considers that the authentication of the MS has been failed in step 1118 and transmits an RNG-RSP message indicating the failed authentication to the MS in step 1120.

FIG. 12 is a flowchart illustrating an operation of the PC in relation to the idle mode transition and location update according to the first exemplary embodiment of the present invention.

Referring to FIG. 12, the PC acquires a first SAI from a message received from the BS in step 1202 and receives an LU-REQ message including a second SAI in step 1204. In step 1206, the PC compares the first and second SAIs. If the two SAIs are identical, the PC proceeds to step 1209. If the SAIs are different, the PC determines that the MS is failed in authentication in step 1210 and transmits an LU-RSP message indicating the authentication failure in step 1212.

The PC generates an AK context in step 1208 and transmits an LU-RSP message with the AK context to the BS in step 1212. In step 1214, the PC receives an LU-confirm message including the SAI from the BS.

As is apparent from the above description, the present invention advantageously saves resources by authenticating an MS and a message using a partial CMAC value in a wireless mobile communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An authentication method of a mobile station (MS) in a wireless mobile communication system, comprising:
   determining first bits representing a first Cipher based Message Authentication Code (CMAC) value;
   transmitting a ranging request message to a base station (BS), the ranging request message including a second CMAC value, the second CMAC value being corresponded to second bits including a first number of bits among the first bits; and
   receiving a ranging response message indicating whether authentication is successful or failed from the BS, the ranging response message including third bits to be used for a next ranging request, the third bits including a second number of bits among fourth bits corresponding to a fourth CMAC value determined by the BS when the ranging response message indicates that the authentication is successful.

2. The authentication method of claim 1, wherein the first bits comprise 128 bits and the second bits comprise 64 bits of the first bits.

3. The authentication method of claim 1, wherein the ranging request message is one of a message used for an idle-mode MS to request location update and a message used for the idle mode MS to request network re-entry.

4. The authentication method of claim 1, further comprising:
   when transition to an idle mode from an awake mode is required, transmitting to the BS a transition message requesting the transition to the idle mode from the awake mode, the transition message including the second CMAC value; and
   receiving from the BS, a transition response message indicating whether the transition of the idle mode is allowed based on a third CMAC value.

5. An authentication method of a base station (BS) in a wireless mobile communication system, comprising:
   receiving a first message from a mobile station (MS), the first message including a second Cipher based Message Authentication Code (CMAC) value, the second CMAC value corresponding to second bits including a first number of bits among first bits representing a first CMAC value;
   transmitting a second message including the second CMAC value to a paging controller; and
   receiving, from the paging controller, a third message including information for verification of a third CMAC value, the third CMAC value corresponding to third bits including a second number of bits among the first bits after the second message is transmitted to the paging controller.

6. The authentication method of claim 5, wherein when the first message is a message used for an idle-mode MS to request location update, the second message is a message used for the BS to request the location update of the MS, and the third message is a location update response message including an Authentication Key (AK) context required for the verification of the third CMAC value.

7. The authentication method of claim 6, further comprising verifying the third CMAC value using the AK context included in the location update response message.

8. The authentication method of claim 7, further comprising:
   transmitting a ranging response message indicating that the verification of the third CMAC value is successful to the MS when the verification of the third CMAC value is successful; and
   transmitting a location update confirm message including the second CMAC value to the paging controller.

9. The authentication method of claim 5, further comprising:
   when the third message does not include an Authentication Key (AK) context required for the verification of the third CMAC value, transmitting a ranging response message indicating failed authentication to the MS; and
   transmitting a location update confirm message indicating failed location update of the MS to the paging controller.

10. The authentication method of claim 5, wherein when the first message is a message used for an idle-mode MS to request network re-entry, the second message is a message requesting MS information of the idle mode MS, and the third message is a MS information response message including an Authentication Key (AK) context required for the verification of the third CMAC value.

11. The authentication method of claim 5, further comprising:
   when a fourth message requesting transition to an idle mode from an awake mode is received from the MS, acquiring a fifth CMAC value, the fifth CMAC value corresponding to fifth bits having the second number of bits of fourth bits representing a fourth CMAC value included in the fourth message;
   transmitting a MS information request message including the fifth CMAC value to the paging controller;
   receiving a MS information response message from the paging controller; and
   transmitting to the MS a fifth message indicating whether transition of the idle mode is allowed.

12. The authentication method of claim 5, wherein the first bits comprises 128 bits, the second bits comprise upper 64 bits of the first bits, and the third bits comprise lower 64 bits of the first bits.

13. An authentication method of a paging controller in a wireless mobile communication system, comprising:
    receiving a first message from a base station (BS), the first message including a second Cipher based Message Authentication Code (CMAC) value, the second CMAC value being corresponded to second bits including a first number of bits among first bits representing a first CMAC value, and storing the second CMAC value;
    receiving a second message including a third CMAC value from the BS;
    comparing the second CMAC value with the third CMAC value; and
    generating an Authentication Key (AK) context required for the BS to perform verification of a fourth CMAC value, the fourth CMAC value being corresponded to fourth bits including a second number of bits among the first bits when the second and third CMAC values are identical, and transmitting a third message including the AK context to the BS.

14. The authentication method of claim 13, wherein when the second message is a location update request message, the third message is a location update response message.

15. The authentication method of claim 13, further comprising transmitting the third message indicating authentication failure to the BS without generating the AK context when the second and third CMAC values are different.

16. The authentication method of claim 13, wherein the first bits are 128 bits, the second bits are upper 64 bits of the first bits, and the fourth bits are lower 64 bits of the first bits.

17. A mobile station (MS) in a wireless mobile communication system, the MS comprising:
    a controller configured to determine first bits representing a first Cipher based Message Authentication Code (CMAC) value;
    a transmitter configured to transmit a ranging request message to a base station (BS), the ranging request message including a second CMAC value, the second CMAC value being corresponded to second bits including a first number of bits among the first bits; and
    a receiver configured to receive a ranging request message indicating whether authentication is successful or failed from the BS, the ranging response message including third bits to be used for a next ranging request, the third bits including a second number of bits among fourth bits corresponding to a fourth CMAC value determined by the BS when the ranging response message indicates that the authentication is successful.

18. The MS of claim 17, wherein the first bits are 128 bits, the second bits are 64 bits, and the third bits are 64 bits.

19. A base station (BS) in a wireless mobile communication system, the BS comprising:
    a receiver configured to receive a first message from a mobile station (MS), the first message including a second Cipher based Message Authentication Code (CMAC) value, the second CMAC value being corresponded to second bits including a first number of bits, among first bits representing a first CMAC value, and receiving from the paging controller, a third message including information for verification of a third CMAC value, the third CMAC value being corresponded to third bits including a second number of bits among the first bits, after a second message including the second CMAC value is transmitted to the paging controller;
    a transmitter configured to transmit the second message to the paging controller; and
    a controller configured to control the transmitter and the receiver.

20. The BS of claim 19, wherein when the first message is a message used for an idle-mode MS to request location update, the second message is a message used for the BS to request the location update of the idle mode MS, and the third message is a location update response message including an Authentication Key (AK) context required for verification of the third CMAC value in the BS.

21. The BS of claim 20, wherein the controller is further configured to verify the third CMAC value using the AK context included in the location update response message.

22. The BS of claim 21, wherein the transmitter is further configured to transmit a ranging response message indicating that the verification of the third CMAC value is successful to the MS when the verification of the third CMAC value is successful, and transmit a location update confirm message including the second CMAC value to the paging controller.

23. The BS of claim 19, wherein the first bits are 128 bits, the second bits are upper 64 bits of the first bits, and the third bits are lower 64 bits of the first bits.

24. A paging controller in a wireless mobile communication system, the paging controller comprising:
    a receiver configured to receive a first message from a base station (BS), the first message including a second Cipher based Message Authentication Code (CMAC) value, the second CMAC value being corresponded to second bits including a first number of bits among first bits representing a first CMAC value, and receive a second message including a third CMAC value from the BS;
    a memory configured to store the second CMAC value; and
    a controller configured to compare the second CMAC value with the third CMAC value, and generate an Authentication Key (AK) context required for the base station (BS) to perform verification of a fourth CMAC value, the fourth CMAC value being corresponded to fourth bits including a second number of bits among the first bits when the second and third CMAC values are identical; and
    a transmitter configured to transmit a second message including the AK context to the BS.

25. The paging controller of claim 24, wherein when the second message is a location update request message, the third message is a location update response message.

26. The MS of claim 17, wherein the ranging request message is one of a message used for an idle-mode MS to request location update and a message used for the idle-mode MS to request network re-entry.

27. The MS of claim 17, wherein when transition to an idle mode from an awake mode is required, the transmitter is further configured to transmit to the BS a transition message requesting the transition to the idle mode from the awake mode, the transition message including a third CMAC value corresponding to the third bits, and
    the receiver is further configured to receive from the BS a transition response message indicating whether the transition of the idle mode is allowed based on the fourth CMAC value corresponding to the fourth bits including a third number of bits among the third bits.

28. The MS of claim 17, wherein the ranging response message including the third bits are to be used for a next ranging request, the third bits including a second number of bits among the fourth bits corresponding to the fourth CMAC value determined by the BS when the ranging response message indicates that the authentication is successful.

29. The BS of claim 19, wherein the transmitter is further configured to transmit a ranging response message indicating failed authentication to the MS when the third message does not include an Authentication Key (AK) context required for the verification of the third CMAC value, and transmit a location update confirm message indicating a failed location update of the MS to the paging controller.

30. The BS of claim 19, wherein when the first message is a message used for an idle-mode MS to request network re-entry, the second message is a message requesting information of the idle-mode MS, and the third message is a MS information response message including an Authentication Key (AK) context required for the verification of the third CMAC value.

31. The BS of claim 19, wherein the controller is further configured to acquire a fifth CMAC value, the fifth CMAC value being corresponded to fifth bits including a third number of bits among fourth bits representing a fourth CMAC value included in a fourth message when the fourth message requesting transition to an idle mode from an awake mode is received from the MS, transmit a MS information request message including the fifth CMAC value to the paging controller, receive a MS information response message from the paging controller, and transmit to the MS a fifth message indicating whether transition of the idle mode is allowed.

32. The paging controller of claim 24, wherein the transmitter if further configured to transmit the third message indicating authentication failure to the BS without generating the AK context when the second and third CMAC values are different.

33. The paging controller of claim 24, wherein the first bits are 128 bits, the second bits are upper 64 bits of the first bits, and the fourth bits are lower 64 bits of the first bits.

* * * * *